March 10, 1925.

F. H. BEULWITZ

PROTRACTOR

Filed July 2, 1923

1,529,293

Inventor:
Frederick H. Beulwitz,
By Dyrenforth, Lee, Chritton and Wiles,
Attys.

Patented Mar. 10, 1925.

1,529,293

UNITED STATES PATENT OFFICE.

FREDERICK H. BEULWITZ, OF CHICAGO, ILLINOIS.

PROTRACTOR.

Application filed July 2, 1923. Serial No. 649,001.

*To all whom it may concern:*

Be it known that I, FREDERICK H. BEULWITZ, a citizen of the United States, residing at Chicago, in the county of Cook and State of Illinois, have invented a new and useful Improvement in Protractors, of which the following is a specification.

Figure 1:
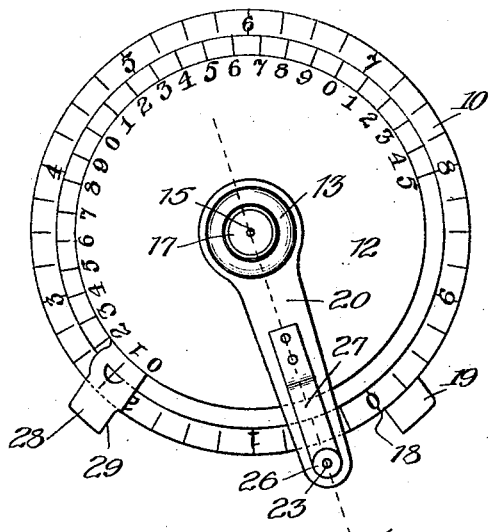
Figure 2:
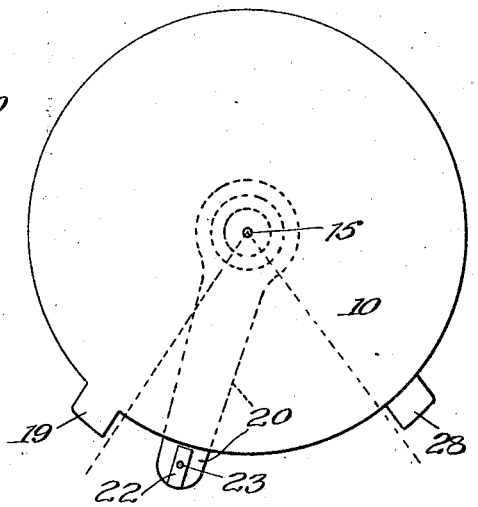
Figure 3:
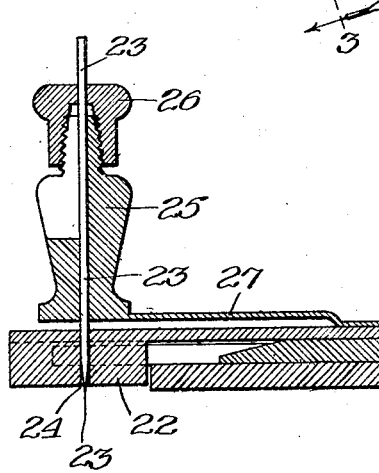
Figure 3:
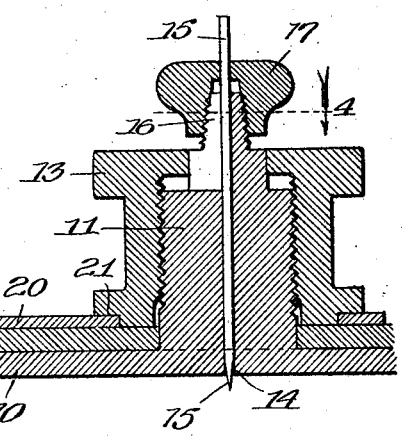
Figure 4:
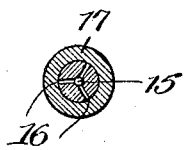

This invention relates to a device for dividing circles, laying out angles and the like and is fully described in the following specification and shown in the accompanying drawings in which:

Figure 1 is a top plan view of the device, Fig. 2 is a bottom plan view of the same, Fig. 3 is an enlarged section on the line 3 of Fig. 1, and Fig. 4 is a section on line 4 of Fig. 3.

The device as illustrated comprises a plate 10 which is preferably circular and has a central threaded post 11 secured thereto. A disk 12 somewhat smaller than the plate 10 is accurately journaled upon the post 11 and is adjustably secured thereto by means of a nut 13 which is screwed down over the threaded portion of the post 11.

The post 11 has a central longitudinal hole 14 in which is fitted a pin 15. This pin extends up through the top of the post which is provided with a series of slots 16 and is threaded and tapered to receive the nut 17. By tightening this nut the pin 15 may be secured in any adjusted position.

The circular plate 10 as illustrated is divided into forty equal spaces, the zero point 18 of this scale lies adjacent the lug 19 which is spaced a short distance from the zero point the purpose of which will later be explained. The disk 12 has a scale covering six tenths of its circumference, this space being divided into twenty-five equal parts so that each of these parts represent .024 of a circle. It will be observed that the spaces on the lower plate represents a fortieth of a circle or .025. The spaces of the two circles consequently differing by one thousandth part of a circle providing a vernier which will be readily understood.

An arm 20 is fitted upon a shoulder 21 on the lower face of the nut 13 so that this arm can readily be moved even when the nut 13 is tightly set upon the disk 12.

This arm carries a block 22 at its outer end which is adapted to swing into contact with the lug 19. This block has a pin 23 which has a good running fit in the opening 24 in the exact center in the block 22, the block 22 being of a thickness to bring the pin 23 exactly on a radial line through the zero point in the outer scale. This pin is carried by a knob 25 which is held in place by a gripping nut 26. This knob is carried by a spring 27 which is secured to the arm 20. The pin 23 is adjustably held by the nut 26 over the plane of the bottom of the member 10.

A lug 28 is carried by the disk 12 and has an edge 29 projecting beyond the periphery of the plate 10, this edge being spaced back of the zero line of the scale on the disk a distance equal to one-half the thickness of the block 22.

To divide a circle into any number of equal parts the fraction of a circle represented, each part is reduced to a decimal and the disk 12 set with respect to the plate 10 to represent this decimal. The pin 15 is then placed in the center of the circle, the plate 10 moved so that the zero point of the scale coincides with one point of the circle to be divided. The arm 20 is then moved so that the block 22 contacts the lug 19 and the knob 25 depressed so as to cause the pin 23 to punch a hole in the paper beneath. With the plate 10 held in this position the lever is then moved so as to bring the block into contact with the lug 28 and the pin 23 is again depressed making a second small hole. The pin 23 is held in this position and the plate 10 and disk 12 rotated until the lug 19 again comes into contact with the block 22, when the plate 10 is again held and the arm 20 moved until it again contacts the lug 28. The pin 23 is again depressed.

This operation is then repeated until the required number of divisions is made. By this arrangement the usual errors of dividing circles is avoided and greater accuracy of dividing is obtained.

In setting the device it will be observed that as the zero point of the disk 12 reaches each of the numbered divisions, the number opposite to which it is placed will be one-tenth of a circle. Each of the smaller divisions is one-fortieth of a circle or twenty-five thousandths. As has been explained each of the smaller divisions of the disk 12 represents twenty-four thousandths of a circle so that for each thousandth beyond one of the smaller divisions of the scale on the plate 10 the operator counts one unit of the dial scale and places that opposite the corresponding number of the units of the outer scale.

It will be apparent that any angle may thus be laid out by first reducing it to a decimal part of the circle.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

I claim:

1. A device for dividing circles comprising a circular plate having a scale thereon dividing the edge of said plate into a number of equal parts, a disk mounted to swing about the center of said plate and having a lug extending over the edge of said plate, said disk being provided with a scale cooperating with said first scale to form a vernier, a lug projecting from the edge of said plate, the facing edges of said lugs forming stops for marking the angular setting of the device, said edges being adjacent the zero point of said scales, and a pin point extending from the center of the bottom of said plate.

2. A device for dividing circles comprising a circular plate having a scale thereon dividing the edge of said plate into a number of equal parts, a disk mounted to swing about the center of said plate and having a lug extending over the edge of said plate, said disk being provided with a scale cooperating with said first scale to form a vernier, a lug projecting from the edge of said plate, the facing edges of said lugs forming stops for marking the angular setting of the device, said edges being adjacent the zero point of said scales, a pin point extending from the center of the bottom of the device, an arm movable about the center of said plate, and a pin carried by said arm adapted to lie on a radial line drawn through the zero point of either scale when moved so that said arm is stopped by either lug.

3. A device for dividing circles comprising a circular plate having a scale thereon dividing the edge of said plate into a number of equal parts, a disk mounted to swing about the center of said plate and having a lug extending over the edge of said plate, said disk being provided with a scale cooperating with said first scale to form a vernier, a lug projecting from the edge of said plate, the facing edges of said lugs forming stops for marking the angular setting of the device, said edges being adjacent the zero point of said scales, a pin point extending from the center of the bottom of said plate, an arm movable about the center of said plate, a block carried by said arm adapted to swing into contact with the facing edges of said lugs, and a pin in the center of said block, said pin being on a radial line drawn through the zero point of either scale when the block is in contact with either lug.

FREDERICK H. BEULWITZ.